United States Patent [19]
Yoshida et al.

[11] Patent Number: 5,771,858
[45] Date of Patent: Jun. 30, 1998

[54] CONTROL APPARATUS FOR DIRECT INJECTION ENGINE

[75] Inventors: Yoshiyuki Yoshida, Hitachinaka; Nobuo Kurihara, Hitachioota, both of Japan

[73] Assignee: Hitachi, Ltd., Japan

[21] Appl. No.: 771,917

[22] Filed: Dec. 23, 1996

[30] Foreign Application Priority Data

Jan. 5, 1996 [JP] Japan .................................. 8-000305

[51] Int. Cl.$^6$ ............................. F02B 31/00; F02D 41/04
[52] U.S. Cl. ....................... 123/306; 123/399; 123/400; 123/432
[58] Field of Search .................................. 123/301, 306, 123/399, 400, 402, 403, 432

[56] References Cited

U.S. PATENT DOCUMENTS

| | | | |
|---|---|---|---|
| 4,909,210 | 3/1990 | Shimada et al. | 123/308 |
| 5,186,139 | 2/1993 | Matsura | 123/301 |
| 5,231,964 | 8/1993 | Harada | 123/306 |
| 5,609,132 | 3/1997 | Minowa et al. | 123/306 |

Primary Examiner—Raymond A. Nelli
Assistant Examiner—Hieu T. Vo
Attorney, Agent, or Firm—Evenson, McKeown, Edwards & Lenahan, P.L.L.C.

[57] ABSTRACT

A control apparatus for a multicylinder direct injection engine includes a fuel injection valve installed at each cylinder, a secondary intake air flow path provided for generating a slewing flow of intake air taken in an intake pipe, and a gas flow control valve for controlling the slewing flow generated in each cylinder by adjusting the flow rate of air flowing through the secondary intake air flow path. The control apparatus further includes an air/fuel controller for controlling the air/fuel control ratio in each cylinder by controlling fuel injection amount without using the opening of the gas flow control valve in the respective cylinder, for a first operational region of a small amount of accelerator operation. The air/fuel controller also includes a valve opening controller for controlling the opening of the gas flow control valve, corresponding to an amount of accelerator operation, for a second operational region of an amount of accelerator operation, which is larger than the amount of accelerator operation in the first operational region. Thereby, the gas flow control valve can also serves as a throttle valve.

6 Claims, 7 Drawing Sheets

CONTROL APPARATUS FOR DIRECT INJECTION ENGINE

BACKGROUND OF THE INVENTION

1. Field of the Invention

The present invention relates to a control apparatus for a direct injection engine in which fuel is directly injected into cylinders, especially to a control apparatus for direct injection engine including a gas flow control valve for controlling the flow of fuel spray, thereby generating a slewing flow of intake air in each of the cylinders.

2. Description of Related Art

In a direct injection engine wherein fuel is directly injected into a respective cylinder by providing a fuel injection valve in the respective cylinder, since it is possible to inject fuel spray gas concentratedly in the vicinity of an ignition plug provided at the respective cylinder, a dilute air-fuel mixture can be certainly ignited. Therefore, it is possible to sufficiently increase the air/fuel ratio without deterioration of combustion performance in the engine.

By using an engine of direct injection, since it becomes possible to improve fuel consumption by sufficiently increasing the air/fuel ratio higher than the theoretical air/fuel ratio in low power operations including idling operations, low fuel consumption performance can easily consist with high power performance in the engine.

Further, in an engine of direct injection, in order to make it possible to operate the engine under the condition of a large air/fuel ratio, namely, a dilute air-fuel mixture, stable combustion is realized by stratifying fuel spray injected into a respective cylinder, in a combustion chamber, with slewing flow generated by intake air flow.

The slewing flow of gas in the combustion chamber is generated by intake air flowing out of a secondary intake flow path of which an outlet part is open in the vicinity of an intake valve provided at the terminal part of an intake pipe. For controlling the intake air flowing out of the secondary intake flow path so as to control the generated slewing gas, the ratio of the flow rate of the intake air flowing out of the secondary intake flow path to the flow rate of intake air flowing in the intake pipe, is controlled by providing an exclusive valve, namely, a gas flow control valve.

In existing techniques, intake air flow mainly used for fuel combustion itself is controlled by a throttle valve installed at the intake pipe, and the gas flow control valve installed downstream of the throttle valve exclusively controls the intake air flow rate through the secondary intake flow path.

The above-mentioned existing technique causes a problem, in that an air intake system of an engine becomes complicated, which further increases the production cost of an engine.

That is, since an additional valve for controlling the amount of intake air flowing out through the secondary intake flow path is provided besides a throttle valve in an existing engine of direct injection, and the composition of the engine is complex, it is difficult to reduce the production cost of an engine.

SUMMARY OF THE INVENTION

An Objective of the Invention:

The present invention has been accomplished in consideration of the above-mentioned problem, and is aimed at providing a control apparatus of direct injection, in which slewing flow generated by intake air injected in a respective cylinder is controlled, having low fuel consumption performance and high operational performance, without increasing the production cost of an engine.

Methods Solving the Problem:

The above-described objective is attained by providing a control apparatus for a multicylinder direct injection engine, including a fuel injection valve installed at a respective cylinder, a secondary intake air flow path provided for generating a slewing flow of intake air taken in an intake pipe and injected into the respective cylinder, and a gas flow control valve for controlling the slewing flow generated in the respective cylinder by adjusting the flow rate of air flowing through the secondary intake air flow path, the control apparatus comprising:

a control means for controlling an air/fuel ratio in a respective cylinder by controlling only a fuel injection amount without executing control based on the opening of the gas flow control valve in the respective cylinder, for a first operational region at a small amount of accelerator operation, wherein the control means further includes a valve opening control means for controlling the opening of the gas flow control valve, corresponding to an amount of accelerator operation, for a second operational region at a larger amount of accelerator operation than an amount of accelerator operation in the first operational region;

whereby the gas flow control valve can also serve as a throttle valve.

By using the above-described control apparatus, since the gas flow control valve can also serve as a throttle valve, it is possible to reduce the number of engine parts, and consequently a production cost of a direct injection engine with a secondary intake air flow path in a respective cylinder.

DETAILED DESCRIPTION OF THE EMBODIMENTS

Hereinafter, details of the present invention will be explained with reference to embodiments shown in the drawings.

Figure 1:
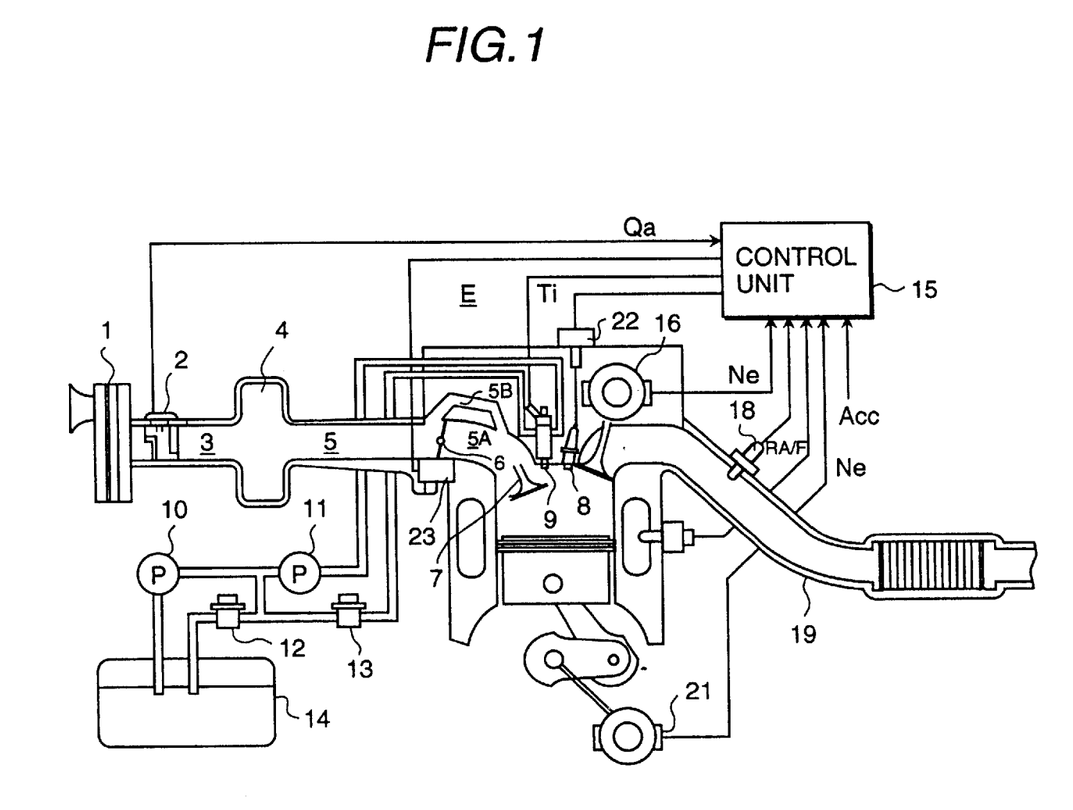
FIG. 1 shows a composition of an engine system of an embodiment according to the present invention.

FIG. 1 shows a composition of an engine system to which an embodiment according to the present invention is applied, and mark E in the figure indicates the engine system.

Intake air of the engine E is taken into an intake pipe 2 through an air cleaner 1, and flows into a collector 4 via an air flowmeter 3. The intake air is then distributed to a respective intake pipe 5 of an intake manifold. The distributed intake air flows through a primary intake flow path 5A and a secondary intake flow path 5B, corresponding to the opening of a gas flow control valve 6 provided in the primary intake flow path 5A of the respective intake pipe 5, and it is led into a respective cylinder C, when an intake valve opens at an intake stroke.

Since the intake air flowing through the secondary intake flow path 5B of which the cross-sectional area is smaller than the one of the primary intake flow path 5A, has a speed considerably higher than the intake air flowing through the primary intake flow path 5A, it generates a slewing flow such as swirl flow, tumble flow, and so forth.

The opening/closing operation of the gas flow control valve 6 is driven and controlled by valve drive equipment including an actuator such as a motor. The ratio of the flow rate of the intake air through the secondary intake flow path 5B to that of the intake air through the primary intake flow path 5A, is controlled by adjusting the opening of the gas flow control valve. Furthermore, in the embodiment, since the total amount of intake air taken into a respective cylinder, is also controlled by adjusting the opening of the gas flow control valve, a throttle valve provided in an intake pipe 3 of an existing ordinary engine is not needed.

At a respective direct injection cylinder C in the engine of the embodiment, an injector 9 (injection valve) is provided in addition to an ignition plug 8.

Fuel such as gasoline is fed from a fuel tank to a fuel system to which the injector 9 is connected, by receiving the first pressurization by a fuel pump 10 and the second pressurization by a fuel pump 11.

The fuel which receives the first pressurization, is adjusted by a fuel pressure regulator 12 so as to keep a constant pressure, for example, of 3 kg/cm$^2$, and the fuel which further receives the second pressurization, is adjusted by a fuel pressure regulator 13 so as to keep a constant pressure, for example, of 30 kg/cm$^2$. Further, the fuel is injected into the respective cylinder C from the injector 9 provided at the respective cylinder C, at the predetermined timing.

A control unit 15 executes the predetermined control processing such as fuel injection amount control, ignition timing control, etc., by taking in signals from various kinds of sensors for detecting operational states of the engine, by executing the predetermined calculation programs, and by outputting the determined control signals to the injectors 9, ignition coils 22, the control valve drive equipment 23, and so forth.

When the engine starts, a signal of the intake flow rate Qa is output from a air flowmeter 3, and input to the control unit 15. Further, signals of reference angle REF indicating a position in a revolution of a respective crank shaft and angle POS used for detecting the engine speed (the revolution number) Ne are obtained by using a crank angle sensor 16 provided at a respective cam shaft of the engine, and also input to the control unit 15.

As the crank angle sensor, a sensor 21 directly detecting the revolution of a respective crank shaft is also available.

Further, an air/fuel (abbreviated to A/F) sensor 18 is provided in an exhaust pipe 19 of the engine, and a signal of actual air/fuel ratio RA/F output from the sensor 18 is also input to the control unit 15.

Furthermore, a sensor for detecting a depression (or operation) amount of an accelerator is attached to an accelerator pedal not shown in the figure, and a signal indicating an operation amount Acc of an accelerator pedal is input to the control unit 15 from the sensor for detecting an operation amount of an accelerator.

The control valve drive equipment 23 is connected to the control unit 15, and opens or closes the gas flow control valve 6 in accordance with a valve opening control signal output from the control unit 15.

As a control method of the gas flow control valve 6, a mechanical control method of opening/closing the valve, linking to the motion of an accelerator depressed by an driver, is also available besides an electrical control method using the control valve drive equipment 23.

Figure 2:
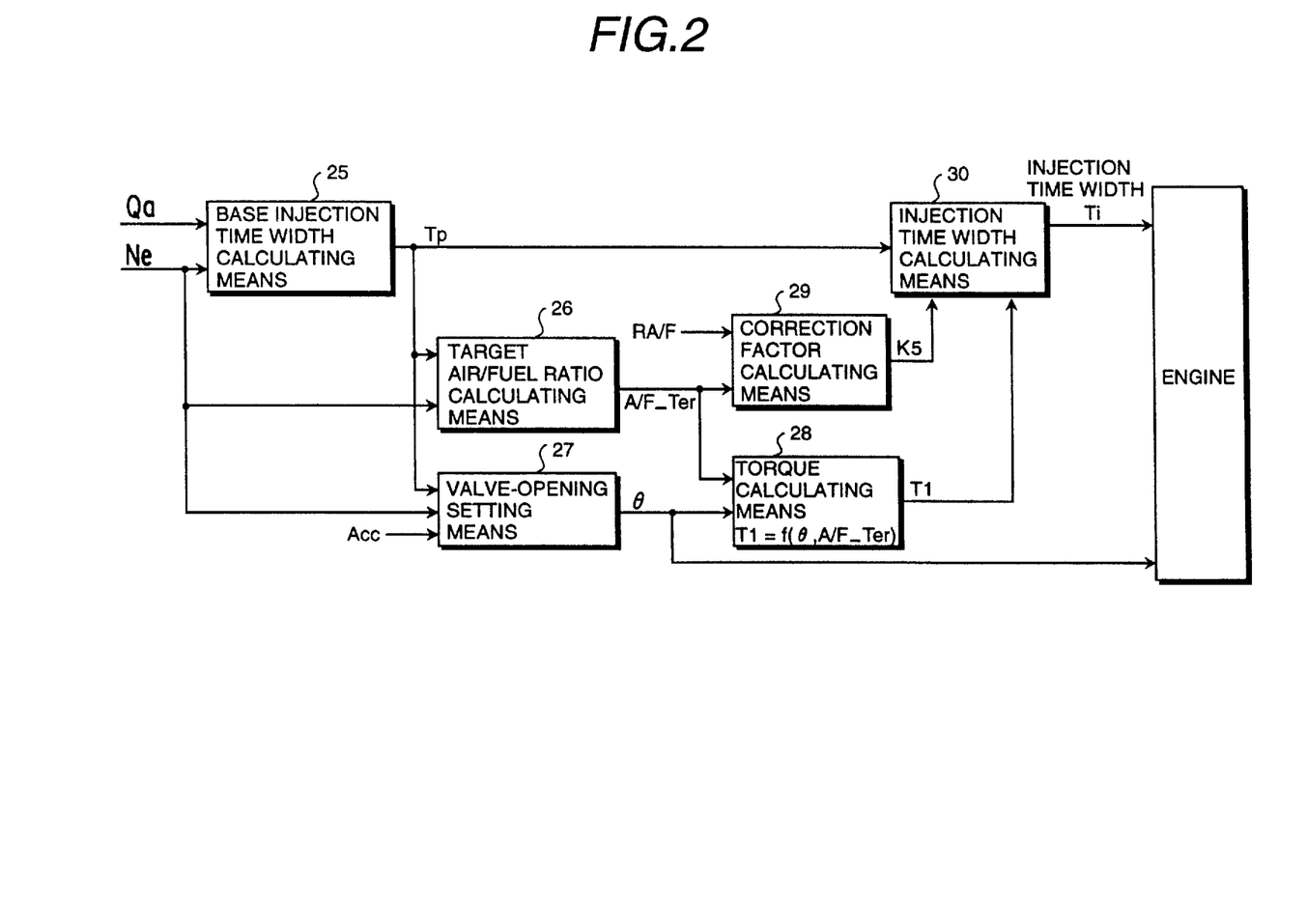
FIG. 2 is a functional block diagram of control executed in the embodiment.

FIG. 2 is a functional block diagram showing an outline of engine control executed in the embodiment, where at first a base injection time width calculating means 25 obtains a base injection time width Tp (equivalent to a fuel injection amount), based on the detected intake air Qa and engine speed Ne, by calculating or searching the time width Tp, on the basis of a function or a map which are expressed by an intake air flow rate Qa and an engine speed Ne.

Next, a target A/F ratio calculating means 26, obtains a target A/F ratio A/F_Ter, based on the obtained base injection time width Tp and the detected engine speed Ne, by calculating or searching the ratio A/F_Ter, on the basis of a function or a map which is expressed by a base time width Tp and an engine speed Ne.

Moreover, a valve-opening setting means 27, determines the opening θ of the gas flow control valve 6, based on the obtained base injection time width Tp, the detected engine speed Ne and the detected operation amount Acc of an accelerator pedal.

A control signal for the obtained opening θ of the valve 6 is sent to the control valve drive equipment 23, and the opening of the valve 6 is adjusted as the value θ by the control valve drive equipment 23.

As mentioned later, the mechanical control method of opening/closing the gas flow control valve 6, linking to the motion of an accelerator operated by an driver, the valve-opening setting means 27 determines the opening of the valve, based on the operation amount Acc of the accelerator.

A torque calculating means 28, obtains the torque T1 of the engine by calculating or searching the torque T1 determined, based on an amount of intake air corresponding to the opening θ of the gas flow control valve 6, on the basis of a function or a map which are expressed by a target A/F ratio A/F_Ter and a valve opening θ.

A correction factor calculating means 29 calculates a correction factor K5 by using the obtained target A/F ratio A/F_Ter and an actual air/fuel ratio RA/F detected by the A/F sensor 16.

Further, an injection time width calculating means 30 determines an injection time width Ti corresponding to the torque T1 necessary for getting an operational state required by a driver, by correcting the obtained base injection time width Tp, based on the torque T1 and the corrected factor K5, and sends a control signal of the injection time width Ti to the injector 9, thus controlling the fuel injection amount.

Figure 3:
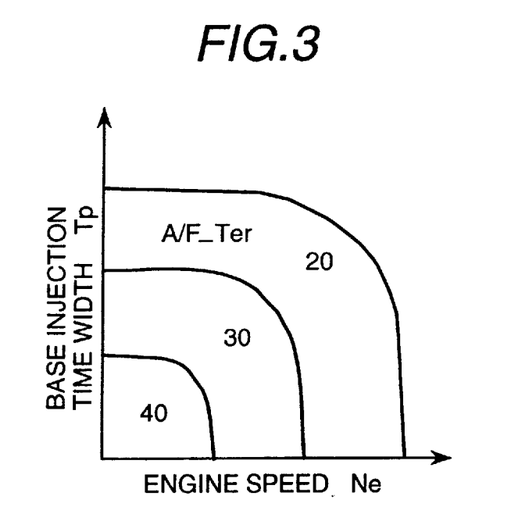
FIG. 3 is a map showing contents of a data table used for determining a target A/F_Ter in the embodiment.

FIG. 3 is an example of a map showing contents of a data table used for determining a target A/F_Ter, based on the obtained base injection time width Tp which corresponds to a load of the engine and the detected engine speed Ne.

As shown in the figure, each region in the map for a target A/F ratio value is indicated corresponding to each interval of the variables Tp and Ne. In a region of low values of Tp and Ne, a target A/F ratio is set as 40, meaning a super-lean fuel mixture, and the ratio decreases to 30 and further to 20, corresponding to the increase in the values of Tp and Ne.

Figure 4:
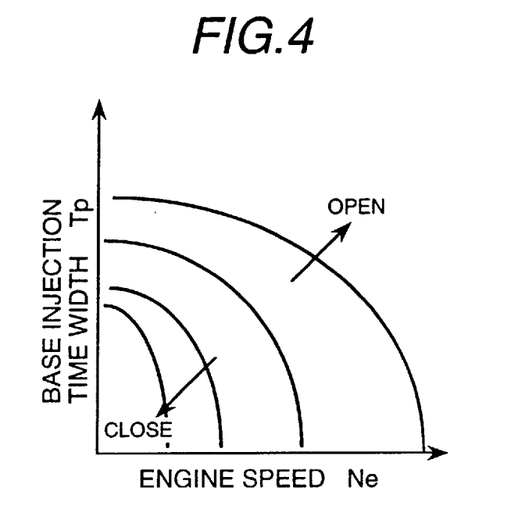
FIG. 4 is a map showing contents of a data table used for determining the opening θ of a gas flow control valve in the embodiment.

FIG. 4 is an example of a map showing contents of a data table used for determining the opening θ of a gas flow control valve 6 in the valve-opening setting means 27 which determines the opening θ of the gas flow control valve 6 with the data table, by using the obtained base injection time width Tp and the detected engine speed Ne, based on the detected operation amount Acc of the accelerator pedal, likely in determining a target A/F ratio A/F__Ter.

As shown in FIG. 4, the map shows that the opening of the valve is decreased for the operational region of a lower engine speed and a lower load, and contrariwise it is increased for the operational region of a higher engine speed and a higher load. In the operational region of a low engine speed and a low load, since fuel mixture is very lean, strong slewing flow is generated in the cylinder C, by setting the opening of the gas flow control valve 6 as small and increasing flow rate of intake air flowing through the secondary intake flow path B shown in FIG. 1, so as to keep stable combustion.

Consequently, in the range of small operation amount Acc of the accelerator pedal, the gas flow control valve 6 is kept almost closed, and the torque control is executed mainly by the A/F control. If an operation amount Acc of the accelerator pedal is larger than some definite amount, the opening θ of the gas flow control valve 6 is controlled roughly in proportion to the operation amount Acc of the accelerator pedal. Thus, the gas flow control valve 6 can also possess the function of a throttle valve.

Figure 5:
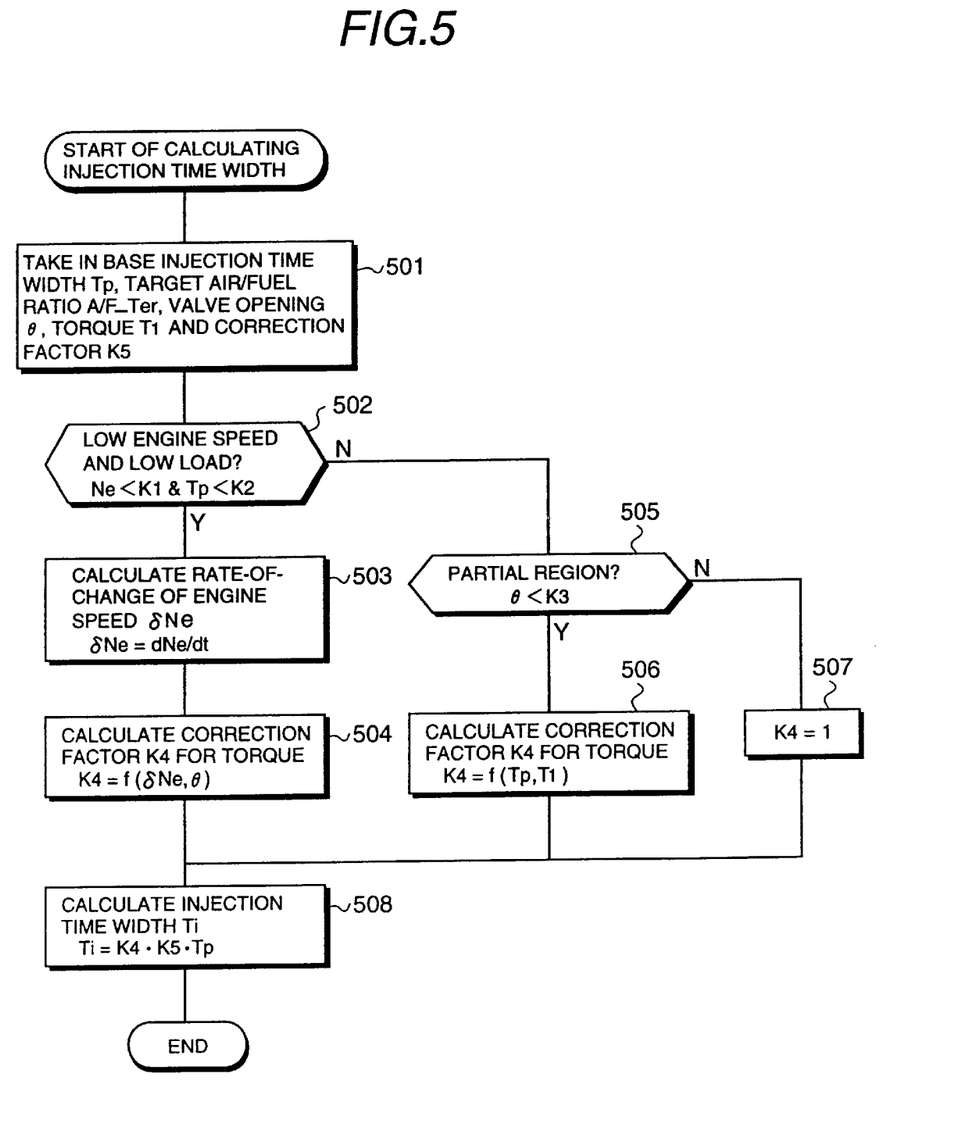
FIG. 5 is a flow chart for explaining processing executed by an injection time width calculating means in the embodiment.

The processing of the injection time width Ti, executed by the injection time width calculating means 30, is explained in detail as follows, by referring to the flow chart shown in FIG. 5.

At first, at step 501, the calculated variables of the target A/F ratio A/F__Ter, the opening θ of the gas flow control valve 6, the base injection time width Tp, the correction factor K5 and the torque T1 of the engine, are taken in.

At step 502, the detected engine speed Ne is compared with a reference value K1 used for determining whether the engine is at an operational state of low engine speed, and the calculated base injection time width Tp is compared with a reference value K2 used for determining whether the engine is at an operational state of low load.

If the result of the determination is Y (Yes), that is, the engine is at an operational state of low engine speed and low load, for example, an idling operation, the process goes to step 503.

At step 503, the rate-of-change δ Ne in engine speed is calculated. In the vicinity of an operational point of the idling operation of low engine speed and low load, intake air flow is throttled by the gas flow control valve 6, and the flow rate of intake air into the cylinder C becomes almost constant. At step 504, a correction factor K4 used for the injection time width corresponding to torque changes is calculated or searched by using the calculated rate-of-change in engine speed δ Ne and the detected opening θ of the gas flow control valve 6, based on a function or a data table, expressed by the rate-of-change in engine speed δ Ne and the opening θ of the gas flow control valve 6. The obtained correction factor K4 is used for calculation of the injection time width Tp at step 508.

Thus, the engine speed control at the idling operation is carried out by injection time width control using the correction factor K4 obtained at step 504.

On the other hand, at step 502, if a result of the determination is N (No), the opening θ of the gas flow control valve 6 is compared with the reference value K3 (for example, the opening at the rated load) used for determining whether the engine is at an operational state of partial load. If a result of the determination is Y, which means that the engine is at an operational state of partial load, process goes to step 506, and the correction factor K4 for the injection time width corresponding to torque changes is calculated or searched by using the calculated base injection time width Tp and the detected torque T1 of the engine, on the basis of a function or a data table which are expressed by an injection time width Tp and torque T1. The obtained correction factor is used for calculating the injection time width at step 508.

Thus, the engine speed control at the partial load operation is carried out by injection time width control using the correction factor K4 obtained at step 506, and the injection time width control is corrected, corresponding to requirement of torque changes.

On the other hand, if a result of the determination at step 505 is N, that is, the engine is at an operational state of the usual operation load, the gas flow control valve 6 is fully opened, and intake air is not throttled. Therefore, the base injection time width Tp can correspond to requirement of torque changes, by itself.

At the usual operation load, the correction factor K4 is set as 1, which means that any correction is not carried out to the base injection time width for corresponding to requirement of torque changes, as shown in processing at step 507.

Thus, the engine speed control at the usual operation load is carried out by the injection time width control using the correction factor K4 obtained as 1 at step 507, and the injection time width control corresponding to requirement of torque changes, is not corrected.

Figure 6:
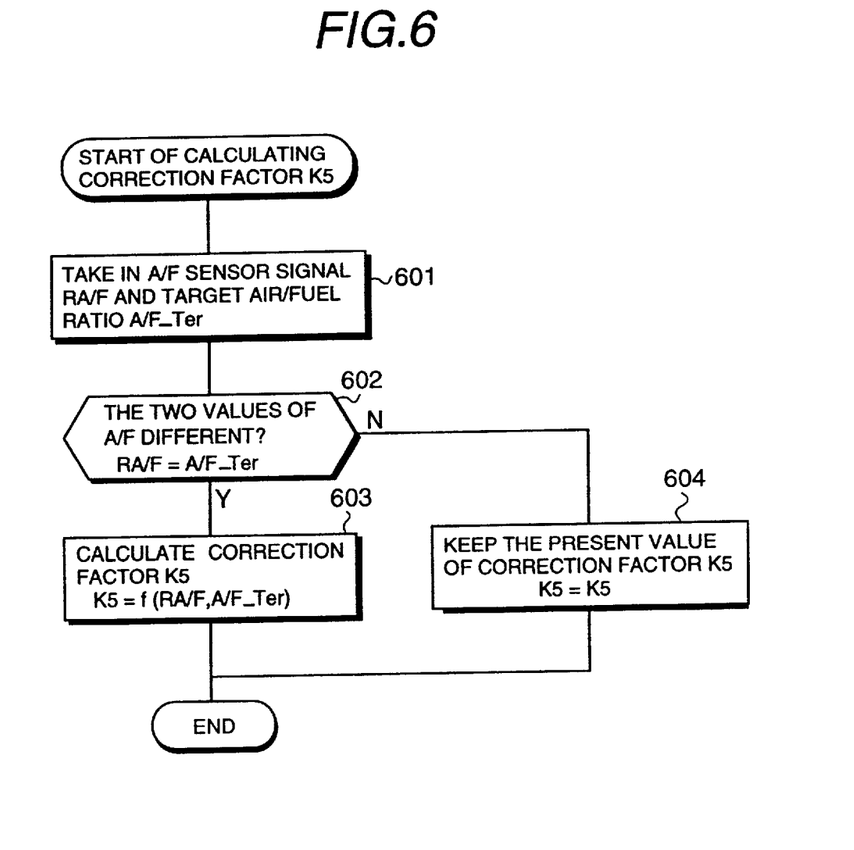
FIG. 6 is a flow chart for explaining processing executed by a correction factor calculating means in the embodiment.

The processing of calculating the correction factor K5, executed by the correction factor calculating means 29, is explained in detail as follows, by referring to the flow chart shown in FIG. 6.

At first, at step 601, the actual A/F ratio RA/F detected by the sensor 18 and the target A/F ratio A/F__Ter obtained by the target A/F ratio calculating means 26, are taken in, and at step 602, it is determined whether the RA/F is different from the target A/F__Ter or not.

If the result of the determination is N, that is, both the A/F ratios are different each other, the processing at step 603 is executed, and the correction factor K5 is changed, based on a function of variables RA/F and A/F__Ter, so that the actual air/fuel ratio agrees with the target air/fuel ratio.

On the other hand, if the result of the determination is Y, that is, the RA/F is equal to the A/F__Ter, the correction factor K5 is kept unchanged.

Thus, by using this embodiment, since the gas flow control valve 6 is controlled in the same manner as a throttle valve provided in the existing engine, it is possible to compose the engine so that the gas flow control valve 6 possesses the same function as that of a throttle valve, and consequently to remove a throttle valve from a direct injection engine in which the secondary intake air flow path is provided in each cylinder.

Further, by using the embodiment, since the provided gas flow control valve 6 for controlling the slewing flow generated by intake air flow, which is indispensable to the combustion of a lean fuel mixture, possesses also the function of an intake air flow rate control usually carried out by a throttle valve, the control of intake air flow rate becomes easier. For example, since the gas flow control valve 6 is almost closed at an operational point in the vicinity of the idling operation, the flow rate of intake air flowing through the secondary intake flow path B is constant, and consequently stable control of the engine speed at the idling operation is realized by fuel injection control based on the constant intake air flow rate.

In the following, another embodiment according to the present invention is explained.

In the above-explained embodiment, the gas flow control valve 6 is driven by the valve drive equipment 23 using an actuator such as a motor. In the another embodiment, the gas flow control valve 6 is connected to the accelerator pedal via a link mechanism, and its opening/closing is mechanically driven by operations of the accelerator pedal, which is the so-called mechanical gas flow control valve driving method.

Figure 7:
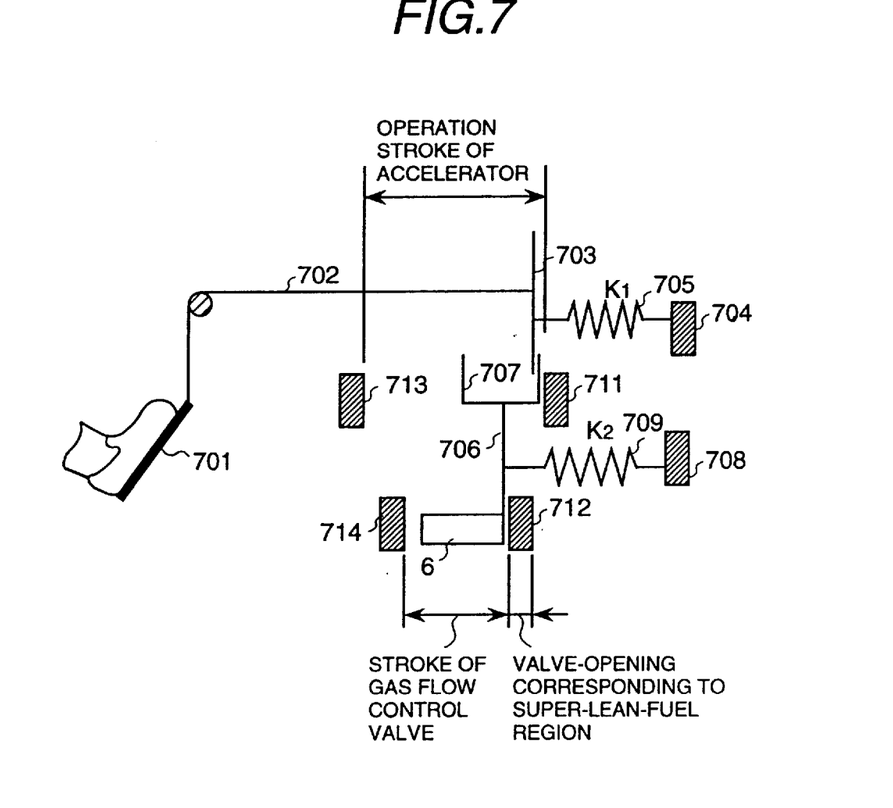
FIG. 7 is a diagram showing a mechanism for mechanically driving a gas flow control valve in another embodiment in which a mechanical valve control method is adopted for controlling the gas flow control valve.

FIG. 7 shows an example of a drive mechanism used for the mechanical gas flow control valve drive method, and the accelerator pedal 701 is linked to an accelerator lever 703 via a wire for mechanical use.

Further, the accelerator lever 703 is directly connected to a return-spring 705 attached to a fix part 704.

If the accelerator is depressed, the accelerator lever 703 is drawn, and the gas flow control valve 6 is driven when the depression stroke of the accelerator pedal exceeds the predetermined stroke preset in a delay mechanism 707 linked to the gas flow control valve 6 by using a mechanical means such as the wire 706.

The delay mechanism 707 is directly connected to a return spring 709 attached to a fix part 708.

Therefore, when the depression stroke of the accelerator pedal is 0, the accelerator lever 703 and the delay mechanism 707 are returned to the position of a stopper 711 by the return spring 705.

Moreover, the position of a stopper 712 is adjusted so that the opening of the gas flow control valve 6 is the opening for generating the slewing flow formed by intake air flow, which is necessary to keep stable combustion with a target air/fuel ratio shown in FIG. 3.

For example, in the super-lean fuel mixture region of a target air/fuel ratio of 40, the opening of the gas flow control valve 6 is kept as the opening for generating the slewing flow necessary to the stable combustion, and the gas flow control valve is not driven until the mechanism 707 having the delay function is moved. The maximum strokes for the delay mechanism 707 and the gas flow control valve 6 are limited by a stopper 713 and a stopper 714, respectively.

Figure 8:
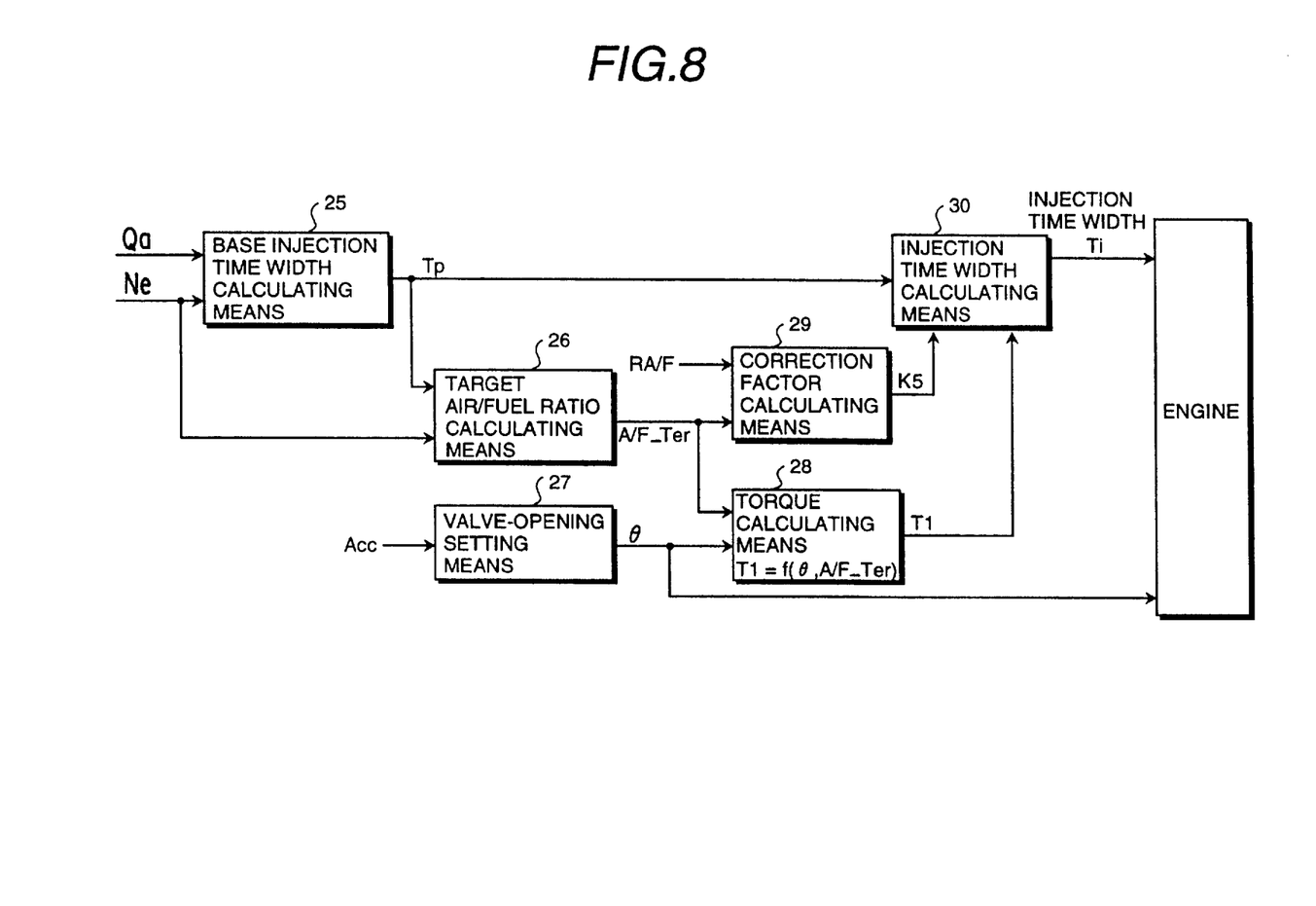
FIG. 8 is a functional block diagram of control executed in another embodiment in which a mechanical valve control method is adopted for controlling the gas flow control valve.

A functional block diagram of control processing executed in the control unit 15 according to this embodiment is shown in FIG. 8. The contents of control processing shown in FIG. 8 is the same as those shown in FIG. 2 except that the valve opening setting means 27 determines the valve opening θ, based on only the operation amount Acc of the accelerator.

Thus, also by using this embodiment to which the mechanical gas flow control valve drive method is applied, since the gas flow control valve 6 is controlled in the same manner as a throttle valve of the existing engine control, it is possible to compose the engine so that the gas flow control valve 6 possesses the same function as that of a throttle valve, and consequently to remove a throttle valve from an direct injection engine in which the secondary intake air flow path is provided in at each cylinder.

Moreover, also by using this embodiment, since the provided gas flow control valve for controlling the slewing flow generated by intake air, which is indispensable to the combustion of lean fuel mixture, possesses also the function of intake air flow rate control usually carried out by a throttle valve, the control of intake air flow rate becomes easier. For example, since the gas flow control valve 6 is almost closed at an operational point in the vicinity of the idling operation, the flow rate of intake air flowing through the secondary intake flow path B is constant, and consequently stable control of the engine speed at the idling operation is realized by fuel injection control based on the constant intake air flow rate.

By using the present invention, it is possible to compose the engine so that the gas flow control valve for controlling the generation of a slewing flow possesses the function of a throttle valve usually used in an existing direct injection engine, since the fuel injection amount is controlled so that the required engine torque agrees with the torque determined, based on the target air/fuel ratio and the intake air amount controlled by the gas flow control valve 6, and consequently to reduce the number of parts composing an engine, which considerably decreases the production cost of an engine system.

What is claimed is:

1. Control apparatus for a multicylinder direct injection engine, including an injector and a spark plug installed at each cylinder, and an intake air pipe at each cylinder having a primary air passage and a secondary air passage provided for generating at least one of swirl and tumble flow of intake air taken in said each cylinder, comprising:

a gas flow control valve provided at said primary air passage and configured to further serve as a throttle valve; and control means for controlling air/fuel ratio in each cylinder by controlling a fuel injection amount without executing control based on the opening of said gas flow control valve in each cylinder, for a first operational region at a small amount of acceleration pedal operation, wherein said control means further includes valve opening control means for controlling the opening of said gas flow control valve, corresponding to an amount of acceleration pedal operation, for a second operational region at a larger amount of acceleration pedal operation than an amount of acceleration pedal operation in said first operational region.

2. A control apparatus for a direct injection engine according to claim 1, wherein said control means comprises electrical motor means.

3. A control apparatus for a direct injection engine according to claim 1, wherein said control means comprises mechanical actuator means.

4. Control apparatus for a direct injection engine including at least one cylinder, an injector and a spark plug installed at said at least one cylinder, and an intake air pipe provided at said at least one cylinder, having a primary air passage and a secondary air passage, a cross section area of said primary passage being larger than that of said secondary air passage, comprising:

an engine control unit; and a gas control valve provided at said primary air passage;

wherein said engine control unit controls said gas flow control valve so as to be closed, and a fuel injection amount from said injector in response to an acceleration pedal operation amount in a first operational region for a small amount of acceleration pedal operation, and controls the opening of said gas flow control valve and the fuel injection amount in response to the acceleration pedal operation amount in a second operational region for a larger amount of acceleration pedal operation than said small acceleration pedal operation amount in said first operational region.

5. Control apparatus for a direct injection engine including at least one cylinder, an injector and a spark plug installed at said at least one cylinder, and an intake air pipe provided at said at least one cylinder, having a primary air passage and a secondary air passage, a cross section area of said primary passage being larger than that of said second air passage, comprising:

an engine control unit; and a gas control valve provided at said primary air passage;

wherein said engine control unit controls said gas flow control valve so as to be held at a substantially fixed opening position, and a fuel injection amount from said injector in response to an acceleration pedal operation amount in a first operational region for a small amount of acceleration pedal operation, and controls the opening of said gas flow control valve operating as a throttle valve of said engine in response to an acceleration pedal operation amount in a second operational region for a larger amount of acceleration pedal operation than said small acceleration pedal operation amount in said first operational region.

6. Direct injection engine including at least one cylinder having an injector, a spark plug and an air intake air pipe having a primary air passage and a secondary air passage, wherein a cross section area of said primary air passage is larger than that of said secondary air passage, and a gas control valve at said primary air passage, comprising:

an engine control unit configured to control said air control valve so as to be held at a substantially fixed opening position and to control a fuel injection amount from said injector in response to an acceleration pedal operation amount in a first operational region for a small amount of acceleration pedal operation, such that the opening of said gas flow control valve and the fuel injection amount are controlled in response to an acceleration pedal operation amount in a second operational region for a larger amount of acceleration pedal operation than said small acceleration pedal operation amount in said first operational region.

* * * * *